US008855557B2

(12) United States Patent
Moosavi (10) Patent No.: US 8,855,557 B2
(45) Date of Patent: Oct. 7, 2014

(54) MOBILE COMMUNICATIONS DEVICE PROVIDING ENHANCED NEAR FIELD COMMUNICATION (NFC) MODE SWITCHING FEATURES AND RELATED METHODS

(75) Inventor: Vahid Moosavi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 238 days.

(21) Appl. No.: 13/359,873

(22) Filed: Jan. 27, 2012

(65) Prior Publication Data

US 2013/0196594 A1    Aug. 1, 2013

(51) Int. Cl.
*H04B 5/00*    (2006.01)

(52) U.S. Cl.
USPC ........................................ 455/41.1; 455/41.2

(58) Field of Classification Search
USPC ................................ 455/41.1, 41.2
See application file for complete search history.

(56) References Cited

U.S. PATENT DOCUMENTS

| 7,499,985 B2 | 3/2009 | Linjama et al. |
| 2006/0079180 A1 | 4/2006 | Sinivaara |
| 2009/0259865 A1 | 10/2009 | Sjeynblat et al. |
| 2010/0127828 A1 | 5/2010 | Connolly et al. |
| 2011/0059694 A1 | 3/2011 | Audic |
| 2012/0040610 A1 | 2/2012 | Moosavi et al. |
| 2012/0040611 A1 | 2/2012 | Griffin et al. |
| 2013/0079026 A1* | 3/2013 | Hagedorn .................. 455/456.1 |

OTHER PUBLICATIONS

U.S. Appl. No. 13/017,473, filed Jan. 31, 2011.
U.S. Appl. No. 13/036,248, filed Feb. 28, 2011.
U.S. Appl. No. 13/359,894, filed Jan. 27, 2012.

\* cited by examiner

*Primary Examiner* — Creighton Smith
(74) *Attorney, Agent, or Firm* — Allen, Dyer, Doppelt, Milbrath & Gilchrist, P.A. Attorneys at Law (57) ABSTRACT

A mobile wireless communications device may include a near field communication (NFC) device operable in a first NFC mode or a second NFC mode, wherein the second NFC mode has a lower power consumption level associated therewith than the first NFC mode. The mobile wireless communications device may further include a processor coupled with the NFC device and capable of detecting a field change via the NFC device when the NFC device is in the second NFC mode, determining a condition of the mobile communications device, and switching the NFC device from the second NFC mode to the first NFC mode based upon the field change and the condition.

26 Claims, 5 Drawing Sheets

FIG. 5 (NON-NFC APPLICATION-REMAIN IN SECOND NFC MODE)

FIG. 4 (NFC APPLICATION-SWITCH TO FIRST NFC MODE)

FIG. 6

MOBILE COMMUNICATIONS DEVICE PROVIDING ENHANCED NEAR FIELD COMMUNICATION (NFC) MODE SWITCHING FEATURES AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is provided herein which may include a near field communication (NFC) device operable in a first NFC mode or a second NFC mode, wherein the second NFC mode has a lower power consumption level associated therewith than the first NFC mode. The mobile wireless communications device may further include a processor coupled with the NFC device and capable of detecting a field change via the NFC device when the NFC device is in the second NFC mode, determining a condition of the mobile communications device, and switching the NFC device from the second NFC mode to the first NFC mode based upon the field change and the condition. As such, the NFC device may advantageously remain in the second NFC mode, despite detecting a field change, and only switch to the higher power first NFC mode when appropriate based upon the condition determined by the processor.

More particularly, the NFC device may be capable of generating a notification based upon detecting the field change, and the processor may be further configured to switch the NFC device from the second NFC mode to the first NFC mode based upon the notification and the condition. The mobile communications device may further include an input device coupled with the processor, and the processor may determine the condition of the mobile communications device based upon the input device. By way of example, the input device may comprise a light sensor, a gyroscope, an accelerometer, or a satellite positioning device. The mobile communications device may further include a display coupled with the processor, and the processor may determine the condition based upon the display.

By way of example, the condition may comprise whether an application being processed by the processor is for use with the NFC device. In addition, after being switched to the first NFC mode, the NFC device may be capable of switching back to the second NFC mode based upon a failure to establish NFC communications while in the first NFC mode. The first NFC mode may comprise at least one of a peer-to-peer (P2P) mode or a read/write (R/W) mode, and the second NFC mode may comprises a low power tag detect mode, for example.

A related communications method may be for a mobile wireless communications device, such as the one described briefly above. The method may include operating the NFC device in a first NFC mode or a second NFC mode, where the second NFC mode has a lower power consumption level associated therewith than the first NFC mode. The method may further include generating a notification at the NFC device based upon detecting a field change when in the second NFC mode, receiving the notification at the processor from the NFC device when the NFC device is in the second NFC mode, determining a condition of the mobile communications device with the processor, and causing the NFC device to switch from the second NFC mode to the first NFC mode based upon the condition.

A related non-transitory computer-readable medium is also for a mobile communications device, such as the one described briefly above. The non-transitory computer-readable medium may have computer executable instructions for causing the mobile communications device to perform steps comprising selectively operating the NFC device in a first NFC mode or a second NFC mode, where the second NFC mode has a lower power consumption level associated therewith than the first NFC mode. The steps may further include generating a notification at the NFC device based upon detecting a field change when in the second NFC mode, receiving the notification at the processor from the NFC device when the NFC device is in the second NFC mode, determining a condition of the mobile communications device with the processor, and causing the NFC device to switch from the second NFC mode to the first NFC mode based upon the condition.

Figure 1:
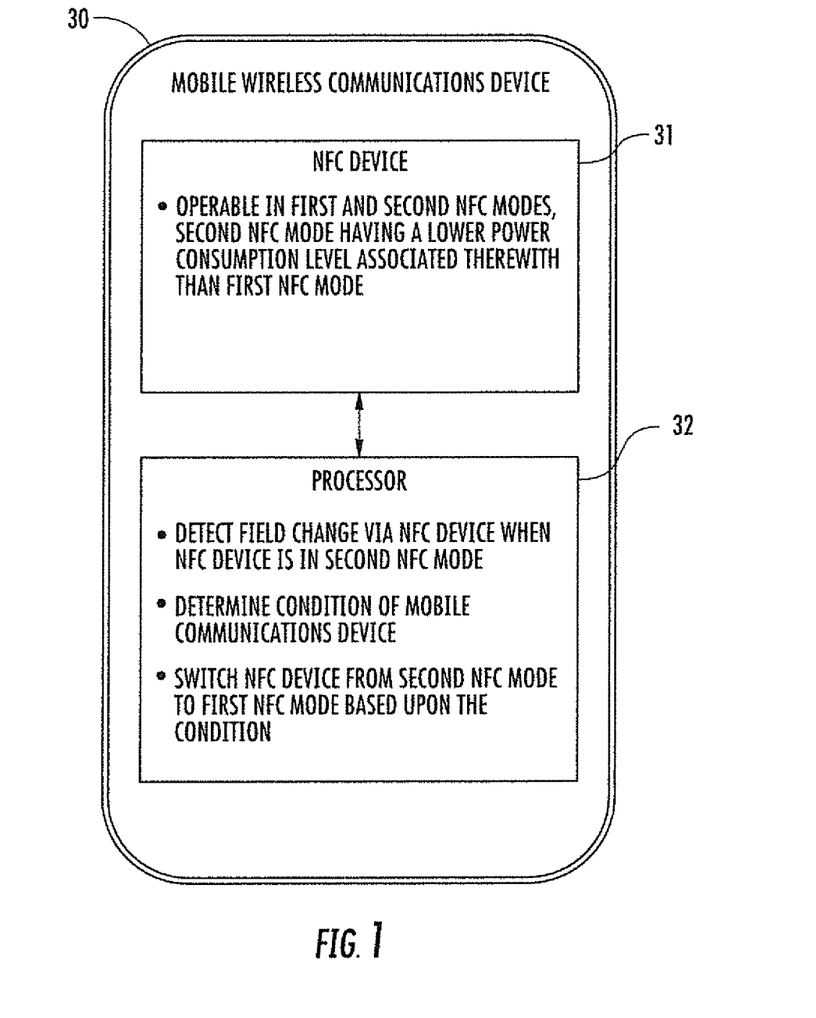
FIG. 1 is a schematic block diagram of a mobile communications device in accordance with one example aspect.

Referring initially to FIG. 1, a mobile communications device 30 (also referred to as a "mobile device" herein) illustratively includes a near field communication (NFC) device 31 and a processor 32 coupled with the NFC device 31. By way of example, the NFC device 31 may be implemented as an NFC chipset including an NFC transceiver, an NFC controller, an embedded memory which may be configured as a secure element, etc., along with associated computer-executable instructions. The processor 32 may comprise a baseband processor, and it may be implemented using a combination of hardware (e.g., microprocessor, etc.) and a non-transitory computer-readable medium having computer-executable instructions for performing the various operations noted herein. The processor 32 and NFC device 31 may communicate via a designated communications channel, such as a JSR-177 communications channel, for example, although other suitable communications formats may also be used. Example mobile devices 30 may include portable or personal media players (e.g., music or MP3 players, video players, electronic book readers, etc.), portable gaming devices, portable or mobile telephones, smartphones, portable computers such as tablet computers, digital cameras, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Moreover, the NFC device 31 may be operable in first and second NFC modes, where the second NFC mode has a lower power consumption level associated therewith than the first NFC mode. By way of example, the first NFC mode may be one of a peer-to-peer (P2P) mode or a read/write (R/W) mode, for example. In these modes, the NFC device 31 may generate electromagnetic carrier field pulses for detecting and communicating with other types of NFC devices. However, when operating in such modes, the NFC device 31 may consume a significant amount of power (e.g., several milliamps per second), which may lead to reduced battery life for the mobile device 30. As such, while this power consumption might be acceptable for short durations when the NFC device 31 is actively communicating, it may be desirable to switch the NFC transceiver to the second, lower power NFC mode when NFC communication is not in use, or is unlikely to be used.

By way of example, the second NFC mode in which the NFC device 31 may be operated may comprise an NFC low power tag detect mode. By way of comparison, in a low power tag detect mode, the NFC device 31 may similarly emit electromagnetic carrier field pulses, but of a relatively shorter duration than in the above-noted P2P or R/W modes, to detect a magnetic field change. That is, rather than attempting to engage in near field communication, which would require longer duration active mode pulses, the NFC device 31 instead emits the shorter pulses for the purpose of determining relative movement with respect to objects in its vicinity. That is, metal or other materials will result in a given magnetic field measurement or reading by the second NFC device 31 when it enters a low power tag detect mode. Yet, when the NFC device 31 and the surrounding object(s) are moved relative to one another, then the given field measurement will change. So, for example, if this measurement changes beyond a threshold level, then the NFC device 31 may determine that the mobile device 30 has been moved, which may in some circumstances be indicative that NFC communication is desired.

In the second NFC mode (e.g., low power tag detection mode), the NFC device 31 may have a significantly lower power consumption than when operating in the first NFC mode. For example, in a low power tag detect mode, the NFC device 31 may have a power consumption (e.g., current draw) in the micro amp per second range (e.g., approximately 15-150 µA).

In some embodiments, the NFC device 31 may cycle between R/W, P2P, and card emulation (CE) modes when it is awakened or activated to scan for (or be scanned by) another NFC device, such as upon being "awakened" from the low power tag detect mode. In the CE mode, the NFC device 31 operates as a passive device, meaning it does not emit electromagnetic field pulses but instead waits for a field from a reader device, thus emulating an unpowered NFC card when it is swiped with a reader. The NFC device 31 may also switch or cycle between the low power tag detect mode and the CE mode when is it "asleep" or in stand-by in the second NFC mode.

Generally speaking, when in a low power tag detect mode, NFC devices are configured to automatically switch to an active scanning mode as soon as soon as a field change is detected. However, a problem associated with such configurations is that a low power tag detect mode may result in numerous false positives. For example, if the mobile device 30 were resting on a countertop with car keys close by, when the car keys are picked up the NFC device would detect or determine that the field had changed. Yet, since the mobile device 30 had not moved, there would likely be no reason to initiate NFC communication, and therefore no reason to switch the NFC device from low power tag detect mode to the first NFC mode.

Figure 3:
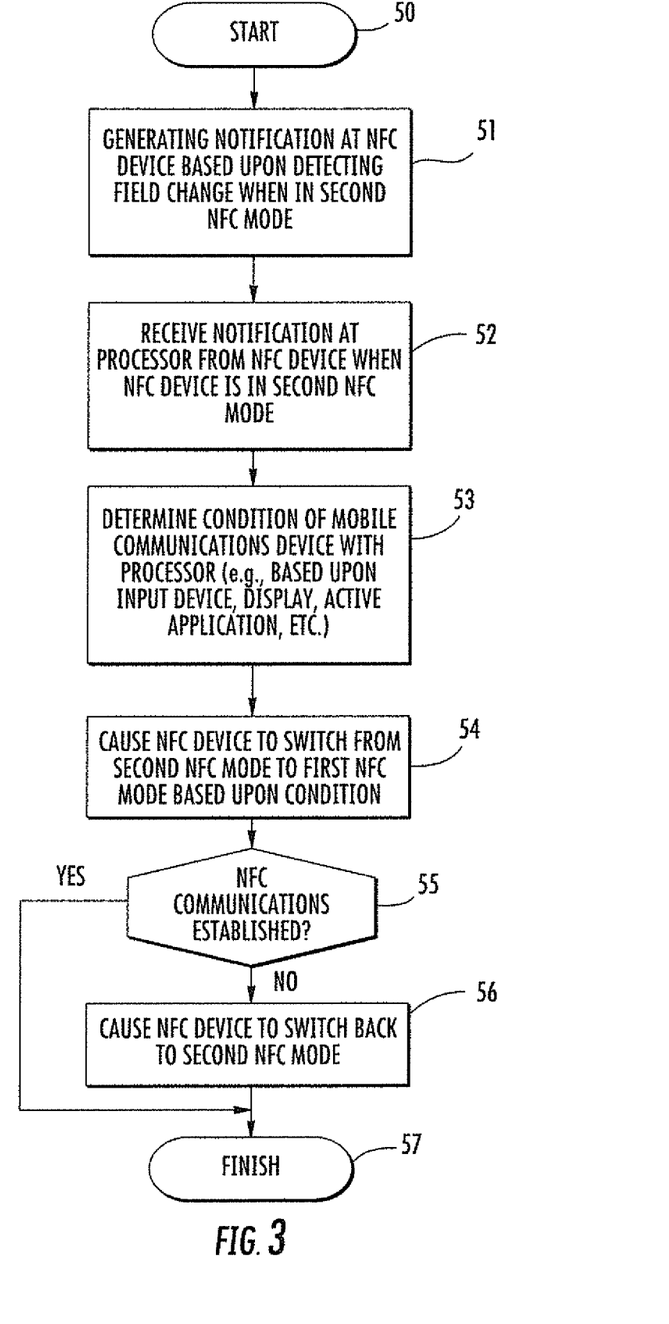
FIG. 3 is a flow diagram illustrating method aspects associated with the mobile communications devices of FIG. 1 or 2.

Referring additionally to FIG. 3, beginning at Block 50, rather than have the NFC device 31 immediately switch to an active mode responsive to detecting a load change on the field when in low power tag detect mode, the processor 32 may instead be made aware of this detection and make determination on whether switching to an active NFC mode is necessary or appropriate. In accordance with one example, the NFC device 31 may advantageously be capable of generating a notification based upon detecting a field change when in the second NFC mode which is received by the processor 32, at Blocks 51-52. For example, the NFC device 31 may measure the field during an initial scan cycle when first switched to the second NFC mode. As long as the field does not change more than a threshold value (which may be configurable in some embodiments) from an initial measured field value, the NFC device 31 will not generate the notification. However, when a field change is detected (i.e., the field changes by more than the threshold value), instead of immediately switching to the first NFC mode as described above in a typical low power tag detect mode implementation, the NFC device 31 may instead generate the notification for the processor 32. This advantageously allows the processor 32 to determine whether switching to the first NFC mode is appropriate, rather than having the NFC device 31 automatically and indiscriminately switch to the first NFC mode, which in some circumstances may result in unnecessary power consumption.

The processor 32 may determine a condition of the mobile device 30 at the time of the detected field change, or before or after the time of the field change, at Block 53, as will be described further below. The condition may be determined responsive to the notification, or the condition determination may be an ongoing operation performed by the processor 32 such that when the notification is received, the current condition of the mobile device 30 will already be known. When the condition warrants or is otherwise appropriate, the processor 32 may cause the NFC device 31 to switch from the second NFC mode to the first NFC mode following receipt of the notification, at Block 54.

Figure 2:
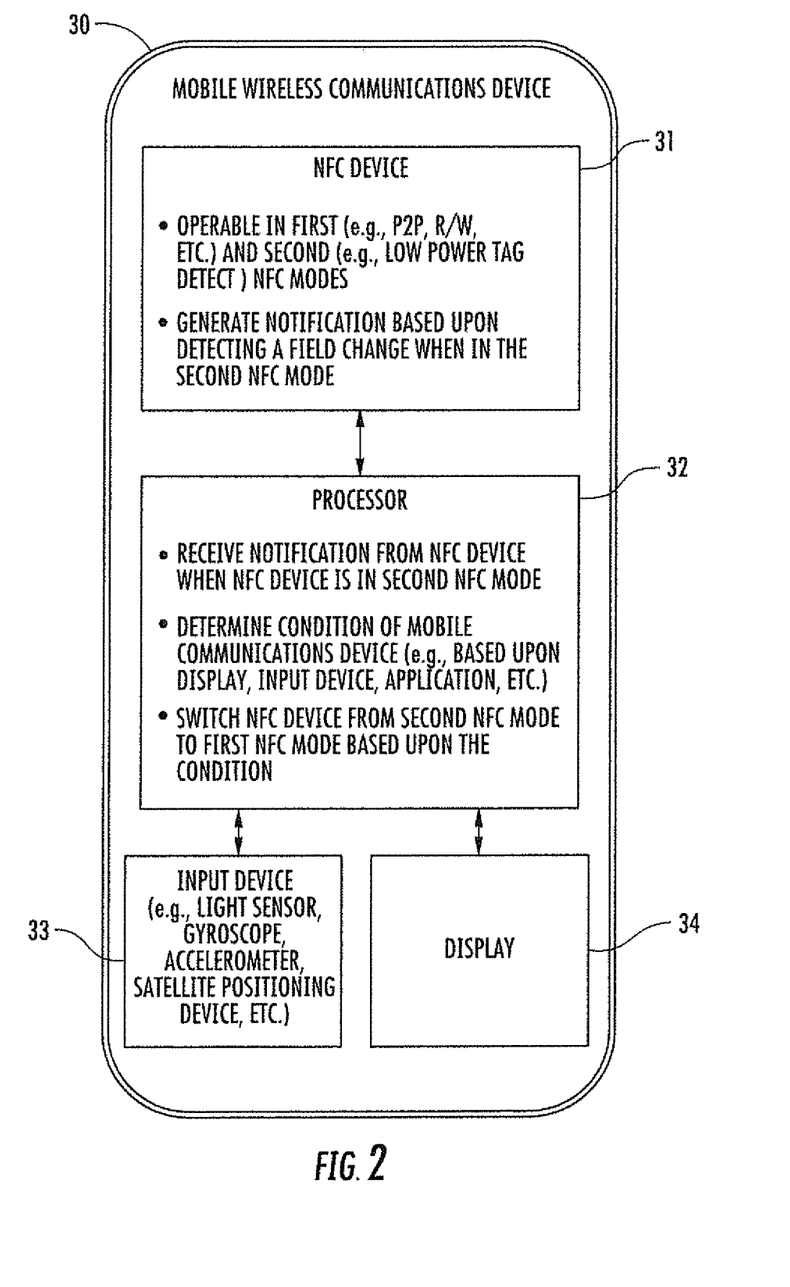
FIG. 2 is a schematic block diagram of the mobile communications device of FIG. 1 in accordance with another example aspect.

Referring further to FIG. 2, the mobile device 30 may also illustratively include one or more input devices 33 coupled with the processor 32. In one example embodiment, the processor 32 may determine the condition of the mobile device 30 based upon the input device 33. For example, the input device 33 may comprise a sensor or module that provides an indication that the mobile device 30 has been moved, such as a gyroscope, an accelerometer, wireless communications device (e.g., Bluetooth, wireless LAN, etc.), or a satellite positioning system device, such as a global positioning system (e.g., GPS, GLONASS, Galileo, or other similar global navigation device). As such, upon receipt of the notification from the NFC device 31 that the field has been changed, if the processor 32 determines that the mobile device 30 has recently been moved or is currently being moved, then this indicates that the field change was a result of movement of the mobile device. This means there may be an increased chance that NFC communication is likely to be required.

Another example input device 33 may comprise a light sensor, such as to determine an ambient light level. By way of example, if the mobile device 30 is within a case, purse, pocket, holster, etc., then a relatively low ambient light level may be detected. Thus, a detected low light level may be considered as an indication that the mobile device 30 is within a purse, pants pocket, holster, etc., and therefore switching to the first NFC mode may be deemed inappropriate despite the detected field change. As such, the processor 32 may allow the NFC device to remain in the second NFC mode.

On the other hand, a relatively high detected light level may indicate that it is appropriate for the processor 32 to cause the NFC device 31 to switch to the first NFC mode. In accordance with another example, multiple inputs may be considered by the processor 32 in determining the condition of the mobile device 30. For example, if a movement sensor (e.g., a gyroscope, accelerometer, satellite positioning device, etc.) determines that the mobile device 30 has been moved or is moving when a notification is received, if the light sensor determines a low light level (e.g., that the mobile device is still within a holster), then the processor 32 may allow the NFC device 31 to remain in the second NFC mode. Other example input devices 33 which may be considered to determine the condition of the mobile device 30 may include one or more input keys (e.g., a keypad or keyboard), a track pad, scroll wheel, track ball, convenience keys or buttons, touch screen, etc.

In accordance with another example, the mobile device 30 may further include a display 34 coupled with the processor 32. Similar to a light sensor, the state of the display 34 (i.e., illuminated or not illuminated, such whether the display is in a sleep or timeout mode or not) may also provide an indication of the condition of the mobile device 30. For example, while the notification may have been received indicating a field change, and a movement sensor may indicate movement is occurring or has occurred, if the display 34 has not been "awakened" or illuminated (e.g., by pressing an input key, touch screen, etc.), then this may be taken as an indication that NFC communications are still not yet required, and thus the processor 32 may accordingly allow the NFC device 31 to remain in the second NFC mode. Conversely, waking or illumination of the display 34 in such a circumstance may result in the processor 32 causing the NFC device 31 to switch to the first NFC mode.

Figure 4:
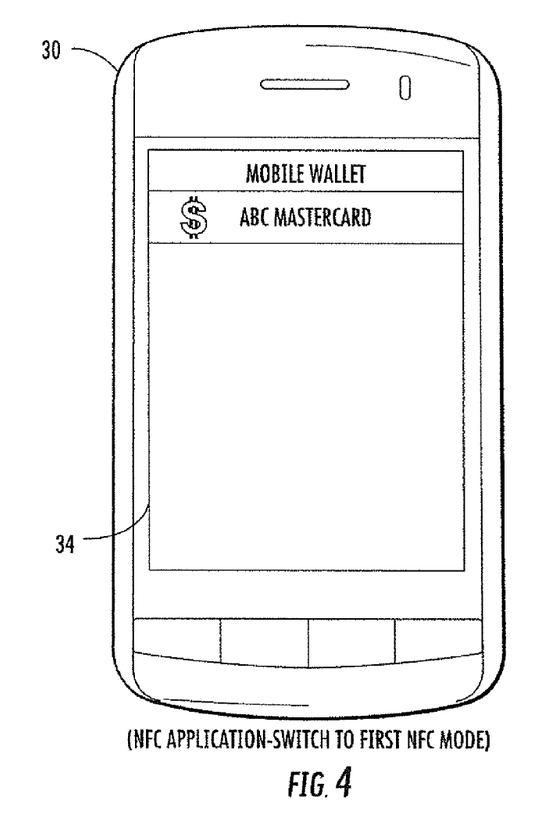
FIGS. 4 and 5 are front views of example mobile devices illustrating different conditions that may be used for determining whether to switch between different NFC modes.
Figure 5:
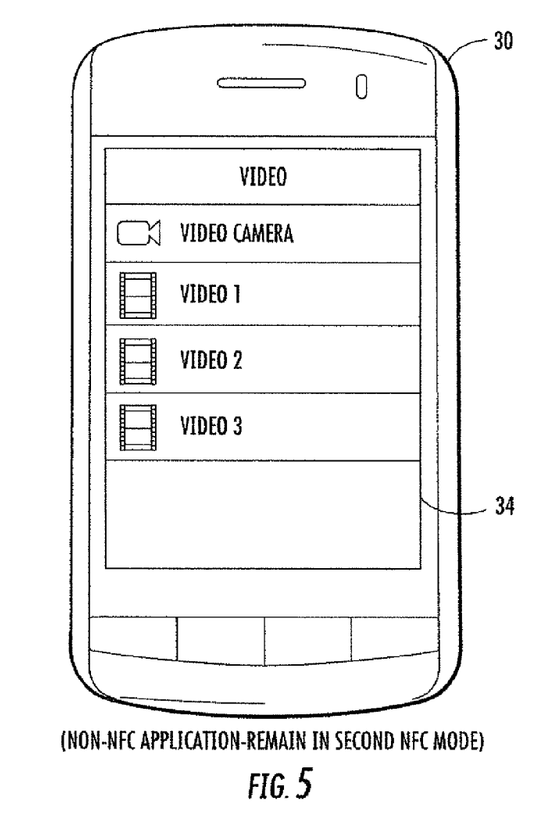

Turning now additionally to FIGS. 4 and 5, in accordance with another example embodiment the condition of the mobile device 30 may correspond with the given application being processed by the processor 32. For example, if the application that is "active" or being processed in the foreground by the processor 32 is for use with the NFC device 31, then the notification may prompt the processor 32 to switch the NFC device 31 to the first NFC scan rate. In the example of FIG. 4, a mobile or electronic wallet application is open and being processed in the foreground (i.e., it is shown on the display 34) by the processor 32. The mobile wallet application provides a user interface for selection of various NFC-enabled "soft" or electronic cards, such as electronic credit, security, or transportation cards, to communicate with corresponding NFC terminals or readers via the NFC device 31. As such, having the mobile wallet application (or other applications that utilize NFC communication) in the foreground or active as shown in FIG. 4 may cause the processor 32 to cause the NFC device 31 to switch to the first NFC mode when the notification is received.

On the other hand, in the example of FIG. 5 the active or foreground application is a video application, which provides a user interface for reviewing stored video files and capturing new videos via a video camera feature. Since this example application is not configured for utilizing NFC communication, if the notification is received while this application is active then the processor 32 may allow the NFC device 31 to remain in the second NFC mode.

In some embodiments, once the notification is generated, the condition of the mobile device 30 may be used not only to determine whether the NFC device 31 should be switched to the first NFC mode, but more particularly how the first NFC mode may be implemented. That is, the processor 32 may advantageously instruct the NFC device 31 whether a P2P or R/W scan mode is appropriate based upon the given condition of the mobile device 30. For example, if an image file has been designated for transfer to another NFC-enabled device, the processor 32 may advantageously instruct the NFC device to switch to a P2P mode, which may be most appropriate for the file transfer. In accordance with another example, if a security card has been selected, the processor 32 may instruct the NFC device 31 to switch to the R/W mode in anticipation of communicating with a security access terminal, for example.

To provide still further power saving features, after being switched to the first NFC mode, the NFC device 31 may optionally switch back to the second NFC mode based upon a failure to establish NFC communications while in the first NFC mode, at Blocks 55-56, which illustratively concludes the method shown in FIG. 3 (Block 57). For example, upon switching from the second NFC mode to the first NFC mode, if after a given number of scans in the R/W or P2P (or both) modes the NFC device 31 does not establish an NFC communications link with another NFC device, then the NFC device 31 may again return to the second NFC mode (e.g., the low power tag detect mode), at which point the steps described with reference to Blocks 51-54 may be repeated. In accordance with one example implementation, the given number of scans may be about twenty or less, although other numbers may be used in different embodiments. Here again, this may result in a significant reduction in power consumption, as operation of the NFC device 31 in the first NFC mode may require current consumption on the order of micro amps versus milliamps for the second NFC mode. In another embodiment, the NFC device 31 may switch back to the second NFC mode upon failure to establish NFC communication while in the first NFC mode within a particular threshold time (e.g. 30 seconds) after switching to the first NFC mode. The threshold time may be configured via a user interface of the mobile device 30.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
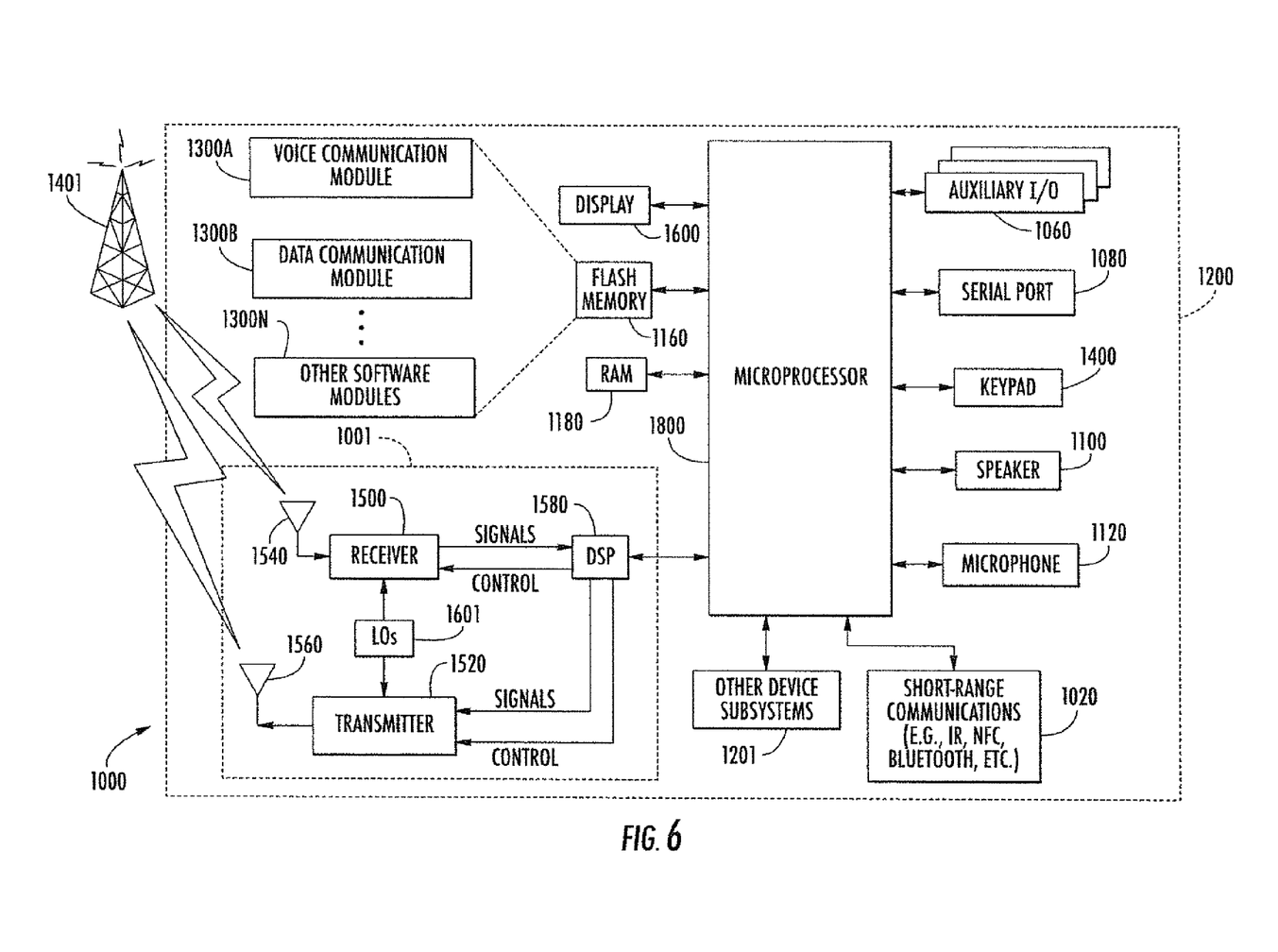
FIG. 6 is a schematic diagram illustrating example components that may be used with the mobile communications devices of FIG. 1 or 2.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a near field communication (NFC) device operable in a first NFC mode or a second NFC mode, wherein the second NFC mode has a lower power consumption level associated therewith than the first NFC mode, and the NFC device being capable of generating a notification based upon detecting a field change; and
a processor coupled with the NFC device and capable of
detecting the field change via the notification from the NFC device when the NFC device is in the second NFC mode,
determining a condition of the mobile communications device, and
switching the NFC device from the second NFC mode to the first NFC mode based upon the notification and the condition.

2. The mobile communications device of claim 1 further comprising an input device coupled with the processor; and wherein the processor determines the condition of the mobile communications device based upon the input device.

3. The mobile communications device of claim 2 wherein the input device comprises a light sensor.

4. The mobile communications device of claim 2 wherein the input device comprises a gyroscope.

5. The mobile communications device of claim 2 wherein the input device comprises an accelerometer.

6. The mobile communications device of claim 2 wherein the input device comprises a satellite positioning device.

7. The mobile communications device of claim 1 further comprising a display coupled with the processor; and wherein the processor determines the condition based upon the display.

8. The mobile communications device of claim 1 wherein the condition comprises whether an application being processed by the processor is for use with the NFC device.

9. The mobile communications device of claim 1 wherein, after being switched to the first NFC mode, the NFC device is capable of switching back to the second NEC mode based upon a failure to establish NFC communications.

10. The mobile communications device of claim 1 wherein the first NEC mode comprises at least one of a peer-to-peer (P2P) mode or a read/write (R/W) mode.

11. The mobile communications device of claim 1 wherein the second NEC mode comprises a low power tag detect mode.

12. The mobile communications device of claim 1 wherein the processor is further capable of determining a change in the condition and switching the NFC device from the second NFC mode to the first NFC mode based upon the field change and the change in the condition.

13. A communications method for a mobile wireless communications device comprising a near field communication (NFC) device and a processor coupled with the NFC device, the NFC device being operable in a first NFC mode or a second NFC mode wherein the second NFC mode has a lower power consumption level associated therewith than the first NFC mode, and the NFC device being capable of generating a notification based upon detecting a field change, the method comprising:
using the processor to detect the field change via the notification from the NFC device when the NFC device is in the second NFC mode;
determining a condition of the mobile communications device with the processor; and
causing the NFC device to switch from the second NFC mode to the first NFC mode based upon the notification and the condition.

14. The method of claim 13 wherein the mobile communications device further comprises an input device coupled with the processor; and wherein determining the condition comprises determining the condition of the mobile communications device based upon the input device.

15. The method of claim 14 wherein the input device comprises a light sensor.

16. The method of claim 14 wherein the input device comprises at least one of a gyroscope or an accelerometer.

17. The method of claim 14 wherein the input device comprises a satellite positioning device.

18. The method of claim 13 further comprising a display coupled with the processor; and wherein determining the condition comprises determining the condition of the mobile communications device based upon the display.

19. The method of claim 13 wherein the condition comprises whether an application being processed by the processor is for use with the NFC device.

20. A non-transitory computer-readable medium for a mobile communications device comprising a near field communication (NFC) device and a processor coupled with the NFC device, the NFC device being operable in a first NFC mode or a second NFC mode wherein the second NFC mode has a lower power consumption level associated therewith than the first NFC mode, and the NFC device being capable of generating a notification based upon detecting a field change, the non-transitory computer-readable medium having computer executable instructions for causing the mobile communications device to perform steps comprising:
detecting the field change via the notification from the NFC device when the NFC device is in the second NFC mode;
determining a condition of the mobile communications device with the processor; and
causing the NFC device to switch from the second NFC mode to the first NFC mode based upon the notification and the condition.

21. The non-transitory computer-readable medium of claim 20 wherein the mobile communications device further comprises an input device coupled with the processor;
and wherein determining the condition comprises determining the condition of the mobile communications device based upon the input device.

22. The non-transitory computer-readable medium of claim 21 wherein the input device comprises a light sensor.

23. The non-transitory computer-readable medium of claim 21 wherein the input device comprises at least one of a gyroscope or an accelerometer.

24. The non-transitory computer-readable medium of claim 21 wherein the input device comprises a satellite positioning device.

25. The non-transitory computer-readable medium of claim 20 wherein the mobile communications device further comprises a display coupled with the processor; and wherein determining the condition comprises determining the condition of the mobile communications device based upon the display.

26. The non-transitory computer-readable medium of claim 20 wherein the condition comprises whether an application being processed by the processor is for use with the NFC device.

* * * * *